United States Patent
Murata (10) Patent No.: US 10,322,645 B2
(45) Date of Patent: Jun. 18, 2019

(54) POWER STORAGE SYSTEM (71) Applicant: TOYOTA JIDOSHA KABUSHIKI KAISHA, Toyota-shi, Aichi-ken (JP)

(72) Inventor: Takashi Murata, Kasugai (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 82 days.

(21) Appl. No.: 15/119,421

(22) PCT Filed: Feb. 18, 2015

(86) PCT No.: PCT/IB2015/000193
§ 371 (c)(1),
(2) Date: Aug. 17, 2016

(87) PCT Pub. No.: WO2015/124993
PCT Pub. Date: Aug. 27, 2015

(65) Prior Publication Data
US 2017/0057376 A1 Mar. 2, 2017

(30) Foreign Application Priority Data

Feb. 21, 2014 (JP) .................................. 2014-031935

(51) Int. Cl.
*B60L 11/18* (2006.01)
*H01M 10/6571* (2014.01)
(Continued)

(52) U.S. Cl.
CPC .......... *B60L 11/1875* (2013.01); *B60L 53/14* (2019.02); *B60L 53/20* (2019.02); *B60L 58/12* (2019.02);
(Continued)

(58) Field of Classification Search
None
See application file for complete search history.

(56) References Cited

U.S. PATENT DOCUMENTS

2009/0140698 A1* 6/2009 Eberhard ............... H02J 7/045
320/152
2009/0189458 A1* 7/2009 Kawasaki ............ B60L 11/182
307/104
(Continued)

FOREIGN PATENT DOCUMENTS

JP 2012-191783 A 10/2012
JP 2012-209213 A 10/2012
JP 2013-005520 A 1/2013

OTHER PUBLICATIONS

Maxim: "Maxim > Design Support > Technical Documents > Application Notes > Battery Management > APP 4169 Understanding Li+ Battery Operation Lessens Charging Safety Concerns", Mar. 7, 2008, Retrieved from the Internet: RL:http://pdfserv.maximintegrated.com/en/an/AN4169.pdf [retrieved on Jun. 25, 2015].

*Primary Examiner* — Todd M Melton
*Assistant Examiner* — Jason R Roberson
(74) *Attorney, Agent, or Firm* — Sughrue Mion, PLLC (57) ABSTRACT

A power storage system for a vehicle includes a battery, a temperature sensor, a battery heater, a charger, and a controller. The battery is configured to supply electric power to a motor for traveling of the vehicle, and configured to be charged with external power supplied from an external power supply. The temperature sensor is configured to detect a temperature of the battery. The battery heater is configured to raise the temperature of the battery. The charger is configured to be connectable with the external power supply, and deliver the external power to the battery and the battery heater, respectively. The controller is configured to perform charge control. The charge control is a control that charges the battery with the external power. The controller is configured to store a map. The map specifies, for each temperature of the battery, a ratio of a temperature-elevating power supplied to the battery heater to a maximum power of the
(Continued)

external power at the time when a charging time is minimized. The controller is configured to calculate the ratio, using the map, from the temperature of the battery measured at the time when charging is started. The controller is configured to perform temperature regulation control during charging, using the temperature-elevating power corresponding to the calculated ratio. The temperature regulation control is a control that supplies a part of the external power to the battery heater during charging so as to raise the temperature of the battery.

7 Claims, 5 Drawing Sheets

(51) Int. Cl.
| | |
|---|---|
| *H01M 10/625* | (2014.01) |
| *H01M 10/633* | (2014.01) |
| *H01M 10/48* | (2006.01) |
| *H01M 10/615* | (2014.01) |
| *H01M 10/44* | (2006.01) |
| *B60L 53/14* | (2019.01) |
| *B60L 53/20* | (2019.01) |
| *B60L 58/12* | (2019.01) |
| *B60L 58/13* | (2019.01) |
| *B60L 58/24* | (2019.01) |
| *B60L 58/27* | (2019.01) |

(52) U.S. Cl.
CPC ............... *B60L 58/13* (2019.02); *B60L 58/24* (2019.02); *B60L 58/27* (2019.02); *H01M 10/443* (2013.01); *H01M 10/486* (2013.01); *H01M 10/615* (2015.04); *H01M 10/625* (2015.04); *H01M 10/633* (2015.04); *H01M 10/6571* (2015.04); *B60L 2210/10* (2013.01); *B60L 2240/445* (2013.01); *B60L 2240/545* (2013.01); *B60L 2240/547* (2013.01); *B60L 2240/549* (2013.01); *H01M 2220/20* (2013.01); *Y02T 10/705* (2013.01); *Y02T 10/7005* (2013.01); *Y02T 10/7044* (2013.01); *Y10S 903/903* (2013.01)

(56) References Cited

U.S. PATENT DOCUMENTS

| | | | |
|---|---|---|---|
| 2010/0318250 A1* | 12/2010 | Mitsutani | B60K 1/02 701/22 |
| 2011/0006731 A1* | 1/2011 | Wang | B60L 11/1816 320/109 |
| 2012/0318783 A1* | 12/2012 | Kamachi | H05B 1/0236 219/497 |
| 2013/0147432 A1 | 6/2013 | Yamamoto et al. | |

* cited by examiner

| BATTERY TEMPERATURE AT START OF CHARGING | T1 | T2 | T3 | T4 | . . . . |
|---|---|---|---|---|---|
| TEMPERATURE-ELEVATING POWER / MAXIMUM POWER | $\alpha 1$ | $\alpha 2$ | $\alpha 3$ | $\alpha 4$ | . . . . |

POWER STORAGE SYSTEM

BACKGROUND OF THE INVENTION

1. Field of the Invention

The invention relates to a power storage system for a vehicle, which includes a battery that supplies electric power to a motor for traveling of the vehicle and is chargeable with electric power supplied from an external power supply.

2. Description of Related Art

In a plug-in hybrid vehicle or an electric vehicle, a battery that supplies electric power to a motor for traveling of the vehicle can be charged (externally charged) with electric power supplied from an external power supply. It is generally known that the charging time is prolonged or increased as the temperature of the battery (battery temperature) is lowered. This is because, when the battery temperature is low, the internal resistance increases, and the charging efficiency deteriorates.

In a system described in Japanese Patent Application Publication No. 2012-191783 (JP 2012-191783 A), when the battery is externally charged using a timer, a part of charting power is used as temperature-elevating power by a heater, and the battery is warmed with the heater during external charging, for improvement of the charging efficiency. In this case, since the battery cannot be charged with an amount of power consumed by the heater until the scheduled charge completion time comes, the scheduled charge completion time is extended, and the battery is additionally charged with the amount of power consumed by the heater.

SUMMARY OF THE INVENTION

The electric power consumed by the heater cannot be used for charging the battery; therefore, when an excessively large amount of power (temperature-elevating power) is consumed by the heater, the charging power supplied to the battery is reduced, and the charging time is prolonged. On the other hand, even when a large amount of charging power is supplied to the battery in a condition where the battery temperature is low, a charging loss is increased, and the charging time is prolonged, since the charging efficiency is low due to increase of the internal resistance.

However, in the system of JP 2012-191783 A, how to divide the power supplied from the external power supply between the temperature-elevating power and the charging power is not taken into consideration, and the period of time required for charging is simply extended so as to additionally charge the battery with electric power corresponding to the temperature-elevating power.

Thus, the object of the invention is to provide a power storage system that is able to charge a battery in a short period of time, while using a part of electric power supplied from an external power supply during charging, as temperature-elevating power for raising the temperature of the battery.

A power storage system for a vehicle according to one aspect of the invention includes a battery, a temperature sensor, a battery heater, a charger, and a controller. The battery is configured to supply electric power to a motor for traveling of the vehicle, and configured to be charged with external power supplied from an external power supply. The temperature sensor is configured to detect a temperature of the battery. The battery heater is configured to raise the temperature of the battery. The charger is configured to be connectable with the external power supply, and deliver the external power to the battery and the battery heater, respectively. The controller is configured to perform charge control. The charge control is a control that charges the battery with the external power. The controller is configured to store a map. The map specifies, for each temperature of the battery, a ratio of a temperature-elevating power supplied to the battery, heater to a maximum power of the external power at the time when a charging time is minimized. The controller is configured to calculate the ratio, using the map, from the temperature of the battery measured at the time when charging is started. The controller is configured to perform temperature regulation control during charging, using the temperature-elevating power corresponding to the calculated ratio. The temperature regulation control is a control that supplies a part of the external power to the battery heater during charging so as to raise the temperature of the battery.

According to the invention, the ratio of the temperature-elevating power to the maximum power is calculated, using the map that specifies the ratio of the temperature-elevating power supplied to the battery heater to the maximum power of the external power when the charging time is minimized, for each temperature of the battery measured when charging is started. Since the temperature regulation control during charging is performed using the temperature-elevating power corresponding to the calculated ratio, it is possible to charge the battery in a short time while raising the temperature of the battery.

The electric power consumed by the battery heater cannot be used for charging the battery. Therefore, when the amount of temperature-elevating power relative to the external power is too large, the charging power supplied to the battery is reduced, and the charging time is prolonged. On the other hand, even when a large amount of charging power is supplied to the battery in a condition where the temperature of the battery is low, a charging loss is increased, and the charging time is prolonged, because of the low charging efficiency. Namely, the charging time varies according to the temperature of the battery, and also varies according to the ratio of the temperature-elevating power supplied to the battery heater, to the maximum power of the external power. Therefore, according to the invention, the ratio of the temperature-elevating power supplied to the battery heater to the maximum power of the external power when the charting time is minimized is specified for each temperature of the battery measured when charging is started, based on the charging time that varies according to the ratio of the temperature-elevating power supplied to the battery heater to the maximum power of the external power. Then, the temperature regulation control during charging is performed with the calculated temperature-elevating power, based on the map that specifies the ratio for each battery temperature. It is thus possible to charge the battery within the shortest charging time while raising the temperature of the battery.

In the power storage system according to the above aspect of the invention, the controller may be configured to perform the charge control and the temperature regulation control in a first charge mode and a second charge mode. In the first charge mode, the battery is charged with a first charging power until an amount of charge of the battery becomes equal to a first charge amount, and a first temperature-elevating power is supplied to the battery heater. In the second charge mode, the battery is charged with a second charging power as a fixed value after the amount of charge of the battery reaches the first charge amount, and a second temperature-elevating power is supplied to the battery heater. The controller may be configured to set a difference between the temperature-elevating power calculated based on the map and the maximum power as the first charging power when the temperature-elevating power calculated based on the map as the first temperature-elevating power. The controller may be configured to newly set the first temperature-elevating power such that the first charging power becomes larger than the second charging power when the set first charging power is smaller than the second charging power.

In the power storage system as described above, the controller may be configured to compare a difference between the maximum power and the second charging power with the temperature-elevating power calculated based on the map. And the controller may be configured to set the first temperature-elevating power using a smaller one of the difference and the temperature-elevating power calculated based on the map. The controller may also be configured to set a difference between the maximum power and the set first temperature-elevating power as the first charging power. When the charging power of the first charge mode is reduced, the charging time in the first charge mode is prolonged, and the overall charging time is prolonged. Thus, in order to suppress prolongation of the charging time, the charging power as a fixed value in the second charge mode may be set as the charging power to be secured at the least in the first charge mode.

However, when a difference between the temperature-elevating power calculated based on the map and the maximum power is set as the first charging power, the thus set first charging power may be smaller than the second charging power, depending on the maximum power of the external power. In this case, the charging power to be secured at the least in the first charge mode may not be secured.

Thus, when the difference between the temperature-elevating power calculated based on the map and the maximum power is set as the first charging power, and the first charging power thus set is smaller than the second charging power, the first temperature-elevating power is newly set, so that the first charging power becomes larger than the second charging power. Namely, when the charging power to be secured at the least in the first charge mode, out of the maximum power of the external power, cannot be secured, the first temperature-elevating power for use in the first charge mode is set with a higher priority given to charging, than to temperature elevation. With this arrangement, prolongation of the charging time in the first charge mode can be suppressed.

The temperature-elevating power calculated based on the map provides the shortest charging time with respect to the maximum power of the external power; therefore, when the temperature regulation control is performed using temperature-elevating power that is different from the temperature-elevating power calculated based on the map, the charging time in the first charge mode becomes longer than the shortest charging time according to the map. However, when the charging power is small, the charging time is not shortened even when the temperature of the battery is raised. Therefore, through the temperature regulation control in the first charge mode with a higher priority given to charging than to temperature elevation, the charging time is increased to be longer than the shortest charging time according to the map, but prolongation of the charging time in the first charge mode is suppressed, and a transition from the first charge mode to the second charge mode can be made earlier, so that the charging time can be shortened.

In order to set the first temperature-elevating power so that the first charging power does not become smaller than the second charging power, the controller may compare a difference between the maximum power and the second charging power, with the temperature-elevating power calculated based on the map, and set the first temperature-elevating power, using the smaller one of the difference and the temperature-elevating power calculated based on the map. The controller may also set a difference between the maximum power and the thus set first temperature-elevating power, as the first charging power.

In the power storage system according to the above aspect of the invention, the controller may be configured to perform the charge control and the temperature regulation control in a first charge mode and a second charge mode. In the first charge mode, a difference between the maximum power of the external power and the temperature-elevating power calculated based on the map is set as a first charging power, and the battery is charged with the first charging power until an amount of charge of the battery becomes equal to a first charge amount, while the temperature-elevating power calculated based on the map is supplied to the battery heater. In the second charge mode, the battery is charged with a second charging power that is smaller than the first charging power after the amount of charge of the battery reaches the first charge amount, and a difference between the maximum power and the second charging power, or electric power corresponding to a maximum output of the battery heater, is supplied to the battery heater.

In the first charge mode, charging and the entire maximum power is used for charging the battery and raising the temperature of the battery. In the second charge mode, on the other hand, the battery is charged with the second charging power that is smaller than the maximum power (the first charging power); therefore, a difference between the maximum power and the second charging power is available as the remaining power. Thus, in the second charge mode, the difference between the maximum power and the second charging power may be used as it is as the temperature-elevating power.

Thus, the temperature-elevating power in the first charge mode and the temperature-elevating power in the second charge mode are variably controlled, and the temperature-elevating power in the second charge mode is set to the maximum available power that can be used in relation to the maximum power of the external power, or set to electric power corresponding to the maximum output of the battery heater within a range of external power that can be used as the temperature-elevating power. With this arrangement, the temperature is raised in the second charge mode using the temperature-elevating electric power that is larger than the temperature-elevating power in the first charge mode, so that the battery temperature can be raised more rapidly. Accordingly, the charging efficiency can be further improved, and the charging time can be further shortened.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described.

Figure 1:
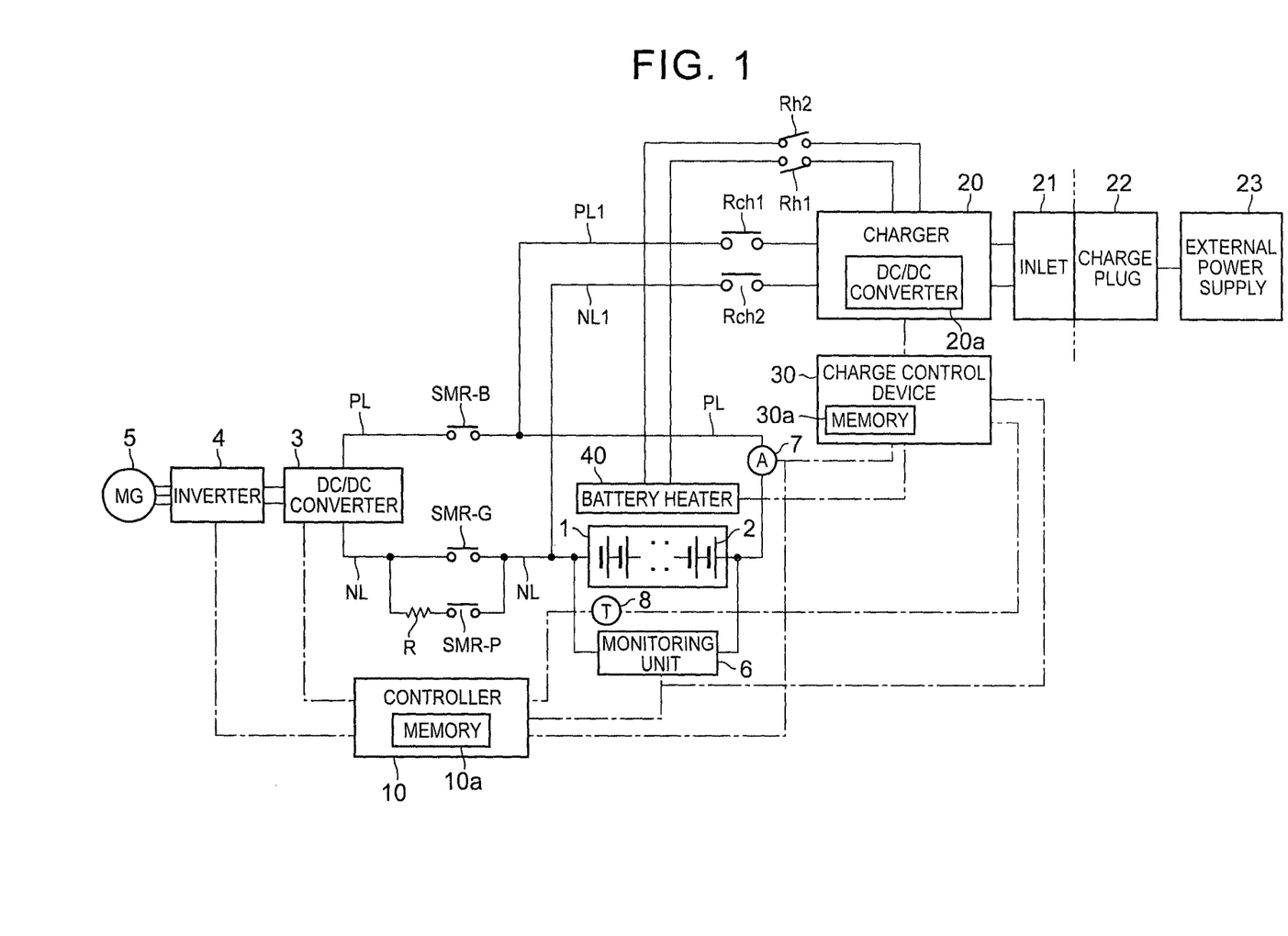
FIG. 1 is a view showing the configuration of a battery system installed on a vehicle according to a first embodiment of the invention.

FIG. 1 through FIG. 8 show a first embodiment of the invention. FIG. 1 is a block diagram showing the configuration of a battery system installed on a vehicle of this embodiment. The battery system may be installed on a vehicle, such as a plug-in hybrid vehicle having a function of charging a battery with power from an external power supply, or an electric vehicle.

The battery system of this embodiment includes a charge/discharge system and an external charge system. In the charge/discharge system, DC power of a battery 1 is supplied to a motor-generator (MG) 5 via an inverter 4, and the battery 1 is charged with regenerative energy during braking of the vehicle. In the external charge system, a temperature regulator is provided for the battery 1, and the battery 1 is charged with electric power from an external power supply 23.

As shown in FIG. 1, the battery 1 is a battery assembly having a plurality of unit cells 2 electrically connected in series. As each of the unit cells 2, a secondary cell, such as a nickel-metal-hydride cell or a lithium-ion cell, may be used. Also, an electric double layer capacitor may be used in place of the secondary cell.

The above-mentioned plurality of unit cells 2 (power storage devices) are electrically connected in series by a bus bar, and constitute the battery 1. A plurality of sets of two or more unit cells 2 electrically connected in parallel may be connected in series, to constitute the battery 1. The number of the unit cells 2 that constitute the battery 1 may be determined as desired, according to the required output, etc. of the vehicle on which the battery 1 is installed.

In the battery system of this embodiment, a DC/DC converter 3 (booster circuit) is connected between the battery 1 and the inverter 4, and the DC/DC converter 3 connected to the battery 1 is connected to the inverter 4. The DC/DC converter 3 can boost or raise the output voltage of the battery 1, and delivers it to the inverter 4. Also, the DC/DC converter 3 can lower the output voltage from the inverter 4 to the battery 1.

System main relays SMR-B, SBR-G are respectively provided in a positive line PL connected to a positive terminal of the battery 1, and a negative line NL connected to a negative terminal of the battery 1. The system main relays SMR-B, SMR-G are switched between ON and OFF, in response to a control signal from a controller 10. A system main relay SMR-P and a current-limiting resistor R are connected in parallel with the system main relay SMR-G, and the system main relay SMR-P and the current-limiting resistor R are connected in series.

The system main relays SMR-B, SMR-G permit the battery 1 and the DC/DC converter 3 (inverter 4) to be electrically connected to each other. To connect the battery 1 to the DC/DC converter 3, the controller 10 initially switches the system main relays SMR-B, SMR-P from OFF to ON. As a result, electric current flows through the current-limiting resistor R, whereby inrush current, which would flow when the battery 1 is connected to the inverter 4, can be curbed or prevented.

After switching the system main relay SMR-G from OFF to ON, the controller 10 switches the system main relay SMR-P from ON to OFF. In this manner, connection between the battery 1 and the DC/DC converter 3 (inverter 4) is completed, and the battery system shown in FIG. 1 is brought into a startup state (ready-on). The controller 10 receives information concerning ON/OFF (IG-ON/IG-OFF) of the ignition switch of the vehicle. The controller 10 starts the battery system, in response to switching of the ignition switch from OFF to ON.

When the ignition switch is switched from ON to OFF, on the other hand, the controller 10 switches the system main relays SMR-B, SMR-G from ON to OFF. As a result, the battery 1 and the DC/DC converter 3 (inverter 4) are disconnected from each other, and the battery system is brought into a stopped state.

A monitoring unit 6 detects a voltage between the terminals of the battery 1, or detects a voltage of each unit cell 2. The monitoring unit 6 outputs the result of detection to the controller 10. The monitoring unit 6 may detect a voltage value of each of the plurality of unit cells 2, or detect a voltage across a set of a given number of unit cells 2 connected in series, as one block. The number of the unit cells 2 included in one block may be set as desired.

A current sensor 7 detects electric current that flows through the battery 1, and outputs the result of detection to the controller 10. In this embodiment, the current sensor 7 is provided in the positive line PL connected to the positive terminal of the battery 1. The position at which the current sensor 7 is provided may be set as appropriate, provided that the current sensor 7 can detect the current flowing through the battery 1. For example, the current sensor 7 may be provided in the negative line NL connected to the negative terminal of the battery 1. Also, two or more current sensors 7 may be used.

A temperature sensor 8 detects the temperature (battery temperature) of the battery 1. The temperature sensor 8 outputs the result of detection to the controller 10. The temperature sensor 8 may be provided at one location in the battery 1, or may be provided at two or more different locations in the battery 1. When two or more detected temperatures of the battery 1 are used, the minimum value or maximum value of the two or more detected temperatures, or a middle value or average of the two or more detected temperatures, or the like, may be used as appropriate, as the temperature of the battery 1.

The controller 10 may include a memory 10a. The memory 10a stores respective detected values of the monitoring unit 6, current sensor 7, and the temperature sensor 8, calculated values of the SOC, full charge capacity, etc. calculated using the respective detected values, various kinds of information used in charge/discharge control, and so forth. The memory 10a may be configured as a separate storage region externally connected to the controller 10. Namely, the memory 10a may be incorporated in or externally connected to the controller 10. This holds true with a memory 30a of a charge control device 30 which will be described later.

The controller 10 calculates (estimates) the SOC of the battery 1, based on the voltage value detected by the monitoring unit 6, current value detected by the current sensor 7, and the battery temperature detected by the temperature sensor 8. Then, the controller 10 performs charge/discharge control of the battery 1, based on the calculated SOC and the estimated value of the full charge capacity. The controller 10 may be configured to include respective functional units, such as an SOC estimating unit, a full charge capacity computing unit, and so forth.

The SOC (state of charge) of the battery 1 represents the ratio of the current charge capacity to the full charge capacity of the battery 1, and the full charge capacity is the upper limit of the SOC. The SOC may be specified from the open circuit voltage (OCV) of the battery 1. For example, the correspondence relationship between the OCV and the SOC of the battery 1 is stored in advance as an OCV-SOC map in the memory 10a. The controller 10 calculates the OCV of the battery 1, from the closed circuit voltage (CCV) detected by the monitoring unit 6, and calculates the SOC from the OCV-SOC map.

Since the correspondence relationship between the OCV and the SOC of the battery 1 varies depending on the battery temperature, the OCV-SOC map may be stored in the memory 10a for each battery temperature, and the SOC of the battery 1 may be estimated by selecting one from OCV-SOC maps for respective battery temperatures, according to the battery temperature detected when the SOC is estimated from the OCV of the battery 1.

Accordingly, the controller 10 can grasp an excessively charged condition or excessively discharged condition of the battery 1, by monitoring the voltage value (CCV) detected by the monitoring unit 6 during charging or discharging. For example, the controller 10 may perform charge/discharge control, by restricting charging of the battery 1 so that the calculated SOC does not become higher than a predetermined upper-limit SOC relative to the full charge capacity, or restricting discharging so that the calculated SOC does not become lower than a lower-limit SOC.

The controller 10 may be provided for each of the DC/DC converter 3, inverter 4, and the motor-generator 5, or may be configured as one control unit constituted by two or more control devices.

Next, an external charging system of the battery system for charging the battery 1 with external power from the external power supply 23 will be described. The external charge system performs external charging of the battery 1 with external power supplied from the external power supply 23, and temperature regulation of the battery 1 using the temperature regulator. The external charging system is started and controlled independently of the charge/discharge system, even in a condition where driving and control of the charge/discharge system are stopped.

A charger 20 is connected to the battery 1 via charge lines PL1, NL1. The charge line PL1 is connected to the positive line PL between the positive terminal of the battery 1 and the system main relay SMR-B. The charge line NL1 is connected to the negative line NL between the negative terminal of the battery 1 and the system main relay SMR-G.

Charge relays Rch1, Rch2 are respectively provided in the charge lines PL1, NL1. The charge relays Rch1, Rch2 are switched between ON and OFF, in response to a control signal from the charge control device 30.

A charge plug 22 is connected to an inlet 21. The charge plug 22 is a connector provided in a charge cable that is extended from the external power supply 23. With the charge plug 22 connected to the inlet 21, external power can be supplied from the external power supply 23 to the battery 1 via the charger 20. In this manner, the battery 1 can be charged, using the external power supply 23. When AC power is supplied from the external power supply 23, the charger 20 converts the AC power from the external power supply 23 to DC power, and supplies the DC power to the battery 1. Charging of the battery 1 with electric power supplied from the external power supply 23 will be called "external charging".

While external charging is performed in a condition where the charge plug 22 is connected to the inlet 21 in this embodiment, the external charging system of the invention is not limited to this arrangement. More specifically, a so-called non-contact charging system may be used for supplying the battery 1 with electric power of the external power supply 23. In the non-contact charging system, electromagnetic induction or resonance phenomena may be utilized, so that electric power can be supplied without passing current through a cable. The non-contact charging system may employ a known arrangement or configuration as appropriate.

The charger 20 includes a DC/DC converter 20a. The DC/DC converter 20a is connected to a battery heater 40, and is operable to raise the voltage of DC power generated from the charger 20, and delivers the resulting power to the battery heater 40. The battery heater 40 is a heating device for raising the temperature of the battery 1, and is also a temperature regulator that is driven with external power.

For example, an electric heater that converts electric energy to thermal energy may be used as the battery heater 40. The battery heater 40 may be provided in direct contact with the battery 1, or may be indirectly provided with a member or space interposed between the heater 40 and the battery 1. Also, two or more electric heaters may constitute one battery heater 40. In this case, heating portions may be provided at two or more locations in the battery 1.

The charger 20 performs first power supply to supply the battery 1 with external power, and second power supply to supply the battery heater 40 with external power via the DC/DC converter 20a. The charger 20 operates according to a control signal of the charge control device 30, and may perform the first power supply and the second power supply at the same time.

Switches Rh1, Rh2 are provided in power supply lines that connect the DC/DC converter 20a with the battery heater 40. The switches Rh1, Rh2 are switched between ON and OFF under control of the charge control device 30. When the switches Rh1, Rh2 are turned ON, the DC/DC converter 20a and the battery heater 40 are connected to each other.

Figure 2:
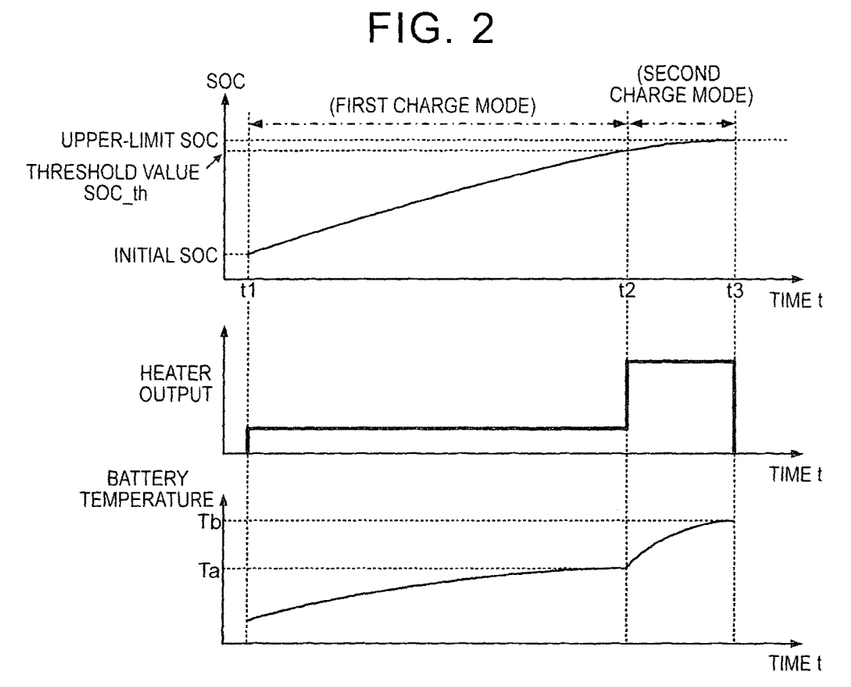
FIG. 2 is a view useful for explaining external charge control including temperature regulation control of a battery according to the first embodiment.

FIG. 2 is a view useful for explaining external charge control including temperature regulation control of the battery 1. In FIG. 2, the horizontal axis indicates time, and the vertical axes indicate the SOC of the battery 1, heater output of the battery heater 40, and the battery temperature detected by the temperature sensor 8, respectively.

In this embodiment, external charging is performed in a selected one of two charge modes, i.e., a first charge mode and a second charge mode. In the first charge mode, constant-current (CC) charging is performed, namely, the battery 1 is charged with a set permissible charging current, when the initial SOC of the battery 1 detected when external charging is started is smaller than a threshold value SOC_th of the first charge mode. In the second charge mode, constant-current constant-voltage (CCCV) charging is performed, namely, the battery 1 is charged with a charging current limited to a value that is smaller than the charging current of the first charge mode, so that the voltage of the battery 1 is controlled to be equal to or lower than a given value.

For example, as shown in FIG. 2, when the initial SOC of the battery 1 is smaller than the threshold value SOC_th, the charge control device 30 starts charging at time t1 with a constant charging current corresponding to the maximum power of the external power supply 23. The SOC (voltage) of the battery 1 increases with time, and reaches the threshold value SOC_th at time t2. At this time (t2), the charge control device 30 switches to the constant-current constant-voltage charging (the second charge mode) in which the charging current is limited to a small value so that the voltage of the battery 1 is controlled to be equal to or lower than the given value. When the SOC reaches the upper-limit SOC at time t3, the charge control device 30 finishes charging.

In the constant-current constant-voltage charging, the upper-limit voltage is provided, and charging current is limited when the SOC reaches the threshold value SOC_th during charging, as described above. When charging is performed in a condition where the SOC is high, the charging efficiency is reduced; therefore, the upper-limit voltage is provided and the charging current is limited to a small value, so as to curb rise in temperature and overvoltage due to reduction of the charging efficiency. When charging is performed at a low temperature, the battery resistance (internal resistance) is increased; therefore, the voltage increases in accordance with the produce of the charging current and the internal resistance, as is understood from the relationship of V≈IR (R: internal resistance). Since the voltage becomes excessively high and deterioration of the battery progresses as the charging current increases, the charging current is limited to a small value when the voltage reaches the upper-limit voltage during charging, to effect constant-current constant-voltage charging, so that the battery deterioration can be curbed or prevented.

In the example of FIG. 2, the upper-limit SOC set during external charging is equal to or lower than the full charging capacity, and may be set to the SOC of the upper limit permitted under the charge/discharge control of the battery 1. The threshold value SOC_th is a threshold value at which a transition from the first charge mode to the second charge mode is made. When the initial SOC detected when external charging is started is larger than the threshold value SOC_th, charging may be started in the second charge mode, without going through the first charge mode.

In this embodiment, a part of the external power supplied from the external power supply 23 is used as temperature-elevating power Pt for raising the temperature of the battery 1, so that the temperature of the battery 1 is regulated under control during charging. As described above, the charging efficiency is reduced when the battery temperature of the battery 1 is low; therefore, the battery 1 is charged with its temperature elevated by the battery heater 40, so that the charging efficiency is improved, and the charging time is shortened.

However, there is a limit to the upper-limit power (maximum power P) of the external power of the external power supply 23. When a part of the external power is used as electric power for operating the battery heater 40, the temperature-elevating power Pt consumed by the battery heater 40 turns out to be electric power with which the battery 1 cannot be charged. Therefore, when the temperature-elevating power Pt is too large, the charging power supplied to the battery 1 is reduced, and the charging time is prolonged. On the other hand, even when a large amount of charging power is supplied to the battery 1 in a condition where the battery temperature is low, a charge loss is increased and the charging time is prolonged, since the charging efficiency is low.

Figure 3:
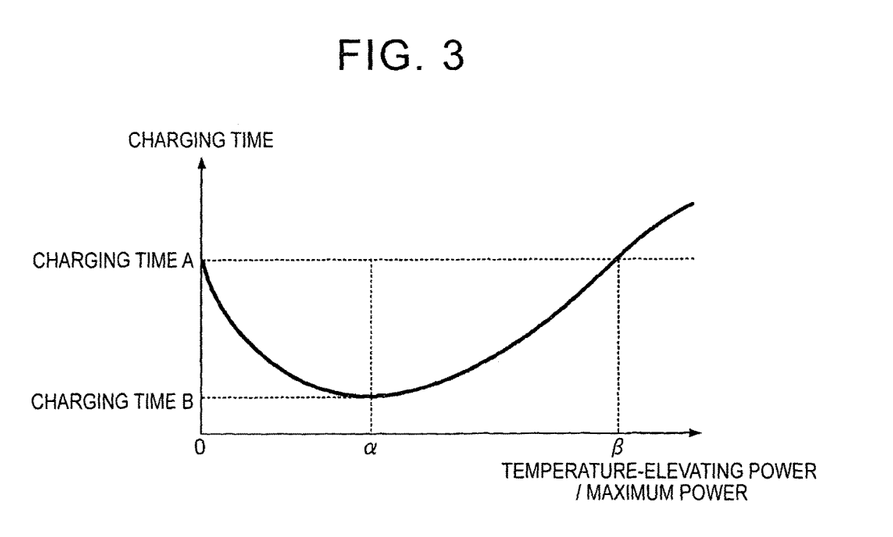
FIG. 3 is a view showing the relationship between the ratio of temperature-elevating power supplied to a battery heater to a maximum power of external power, and the charging time that varies with the ratio, according to the first embodiment.

Namely, the charging time varies according to the battery temperature of the battery 1, and also varies according to the ratio of the temperature-elevating power Pt supplied to the battery heater 40 to the maximum power P of the external power. FIG. 3 shows the relationship between the ratio of the temperature-elevating power Pt supplied to the battery heater 40 to the maximum power P of the external power, and the charging time that varies according to the ratio of the temperature-elevating power Pt to the maximum power P.

In FIG. 3, the vertical axis indicates the charging time, and the horizontal axis indicates the ratio of the temperature-elevating power Pt to the maximum power P of the external power. FIG. 3 shows changes in the charging time when the ratio of the temperature-elevating power Pt to the maximum power P is changed, at a given battery temperature measured when external charging is started. In this example, the temperature-elevating power Pt supplied to the battery heater 40 during charging is constant in each period of charging time.

As shown in FIG. 3, when the entire external power is used as charging power (temperature-elevating power Pt=0), the charging time is equal to A. As the charging power is reduced, and the amount of electric power by which the charging power is reduced is used as the temperature-elevating power, the charge time is shortened. This is because the charging efficiency is increased as the temperature of the battery 1 is elevated, as compared with the case where the temperature of the battery 1 is not elevated.

Thus, when the electric power used as the temperature-elevating power Pt is varied relative to the maximum power P supplied from the external power supply 23, so as to increase the ratio of the temperature-elevating power Pt to the maximum power P, the charging time is gradually shortened, and reaches a minimum (charging time B) when the ratio becomes equal to a certain ratio α. Then, when the temperature-elevating power Pt is increased to provide the above-indicated ratio that exceeds the ratio α, the charging time is prolonged, to the contrary, and becomes equal to the charging time A (in the case of no temperature elevation) when the above-indicated ratio is increased up to a ratio β.

The charging time varies when the ratio between electric power used as the charging power and electric power used as the temperature-elevating power Pt, out of the external power, is varied. The charging time is prolonged when the amount of electric power used as the temperature-elevating power Pt is too large or too small.

In this embodiment, the temperature-elevating power Pt corresponding to the ratio α relative to the maximum power P when the charging time is minimized is specified in advance. In other words, when a part of the external power supplied to the battery 1 is used as temperature-elevating power Pt, the ratio of the temperature-elevating power Pt to the maximum power P when the charging time is minimized is specified in advance.

Figure 4:
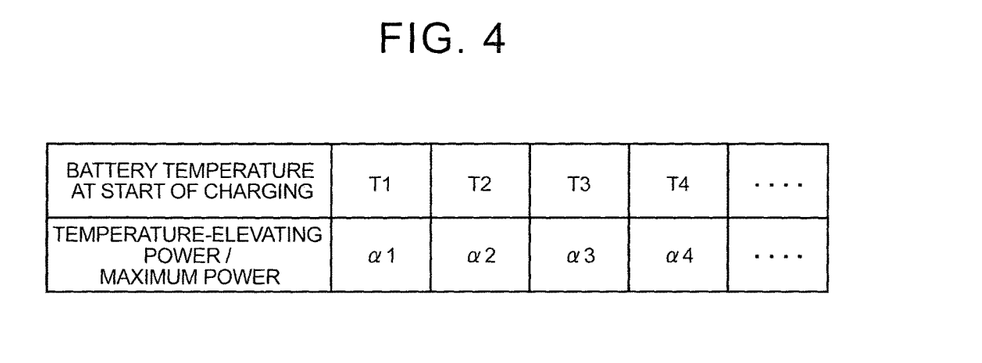
FIG. 4 is an example of map in which the ratio of the temperature-elevating power supplied to the battery heater to the maximum power of the external power when the charging time is minimized is specified for each temperature of the battery measured when charging is started, based on the relationship between the ratio and the charging time that varies with the ratio, according to the first embodiment.

FIG. 4 shows one example of map in which the ratio α of the temperature-elevating power Pt when the charging time is minimized is specified for each battery temperature of the battery 1 measured when charging is started.

The map shown in FIG. 4 may be set in advance by experiment, or the like, as shown in FIG. 3. Since the charging time depends on the battery temperature of the battery 1, the temperature-elevating power Pt relative to the maximum power P also varies according to the battery temperature measured when external charging is started. As in the example of FIG. 4, the ratio of the temperature-elevating power to the maximum power, at which the charging time is minimized, is obtained for each battery temperature of the battery 1. The map of FIG. 4 may be stored in advance in the memory 30a of the charge control device 30.

In the first charge mode as described above, control for regulating the temperature of the battery 1 is performed with the temperature-elevating power corresponding to the ratio of the temperature-elevating power to the maximum power at which the charging time is minimized. In this embodiment, constant-current charging is conducted when the initial SOC is smaller than the threshold value SOC_th, as shown in FIG. 2. At the same time, when the battery temperature is lower than a predetermined value, and it is determined that the temperature needs to be raised, a part of the external power is used as the temperature-elevating power Pt during charging, and the battery 1 is charged with the remaining external power.

Furthermore, as explained above in the example of FIG. 3, the temperature-elevating power Pt calculated from the ratio α specified in the map is kept constant without being changed during charging in the first charge mode, when it is supplied to the battery heater 40. Namely, the temperature of the battery 1 is raised with a constant heater output corresponding to the temperature-elevating power Pt.

As indicated in the middle graph of FIG. 2, the battery heater 40 performs heating operation with a constant heater output corresponding to the temperature-elevating power Pt. As indicated in the lower graph of FIG. 2, the battery temperature of the battery 1 increases with time according to the heating operation of the battery heater 40 and the charging operation of the battery 1 itself.

In the temperature regulation control of this embodiment, the temperature-elevating power Pt is controlled to be different between the first charge mode and the second charge mode in the charging operation during external charging. More specifically, the temperature-elevating power Pt for raising the temperature of the battery 1 in the second charge mode is controlled to be larger than the temperature-elevating power Pt for raising the temperature of the battery 1 in the first charge mode.

Figure 5:
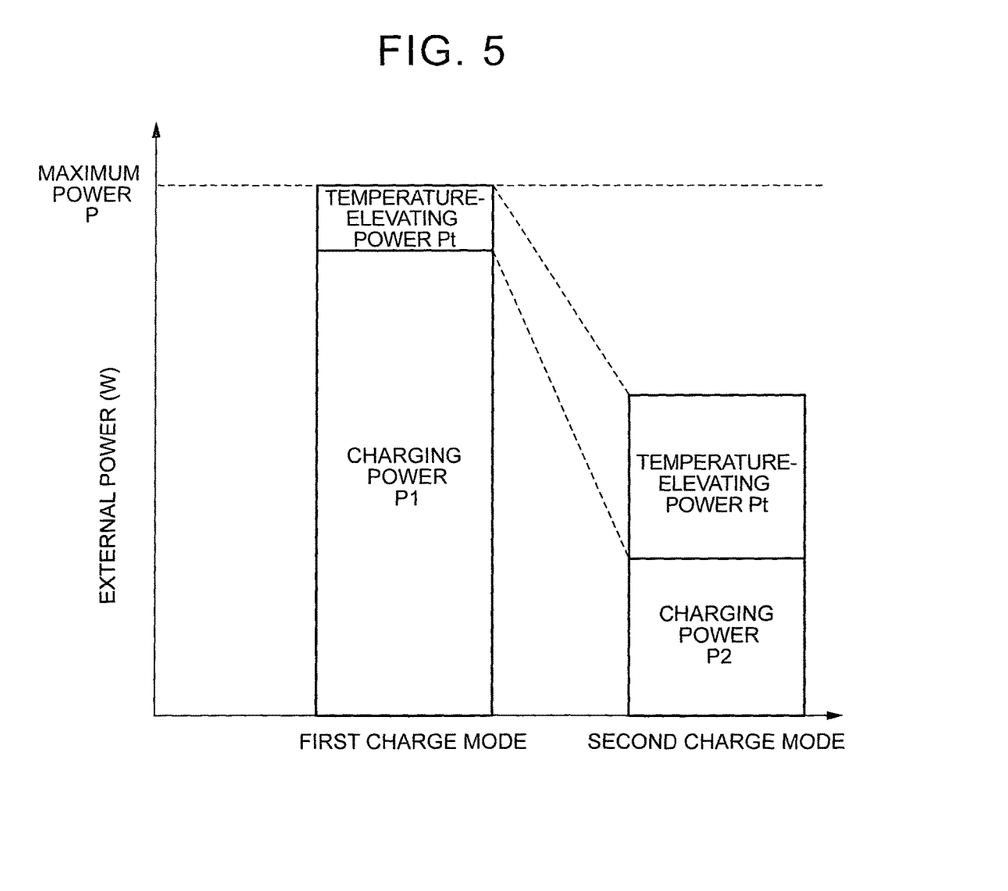
FIG. 5 is a graph indicating the ratio between the temperature-elevating power and the charging power relative to the external power in the first charge mode and the second charge mode according to the first embodiment.

FIG. 5 is a graph indicating the ratio between the temperature-elevating power Pt and the charging power relative to the external power in the first charge mode and the second charge mode. As shown in FIG. 5, in the second charge mode, the battery 1 is charged with the charging power P2 that is smaller than the charging power P1 (the maximum power P−the temperature-elevating power Pt) of the first charge mode. This is because constant-current constant-voltage charging using the charging power P2 is performed in the second charge mode, in which the charging current is limited to a small value, in view of the charging efficiency, overvoltage, etc., as described above.

Namely, in the first charge mode, the entire maximum power P is used for charging and temperature elevation, so that the sum of the charging power P1 and the temperature-elevating power Pt becomes equal to the maximum power P. In the second charge mode, on the other hand, charging is conducted with the charging power P2 that is smaller than the charging power P1; therefore, a difference between the maximum power P and the charging power P2 is available as the remaining electric power. Therefore, in the second charge mode, the difference between the maximum power P and the charging power P2 may be used as it is as the temperature-elevating power.

Thus, the temperature-elevating power Pt in the first charge mode and the temperature-elevating power Pt in the second charge mode are variably controlled, so that the temperature-elevating power Pt in the second charge mode is set to the maximum available power that can be used in relation to the maximum power P of the external power, or set to electric power corresponding to the maximum output Ph of the battery heater 40 within a range of external power that can be used as the temperature-elevating power. With this arrangement, the battery temperature can be raised by a larger degree in the second charge mode, with the temperature-elevating power that is larger than the temperature-elevating power Pt corresponding to the ratio α of the first charge mode. Accordingly, the charging efficiency can be further improved, and the charging time can be further shortened.

The charging power P2 may be set to a fixed value that is set in advance based on the amount of electric power corresponding to a difference SOC between the threshold value SOC_th and the upper limit SOC. In the second charge mode, the battery 1 is charged with a given charging current that is limited so that the voltage of the battery 1 does not exceed the upper-limit voltage, as described above. Therefore, the charging power P2 required to charge the battery 1 with the amount of power corresponding to the difference SOC may be set in advance according to the limited charging current.

Under the external charge control of this embodiment, the charging power P1 corresponding to the maximum power in the first charge mode is variably controlled according to the temperature-elevating power Pt, whereas, in the second charge mode, charging is conducted with the constant charging power P2 that is smaller than the charging power P1, while the charging current is limited to a small value.

The charging power P2 may be set as the upper-limit charging power in the second charge mode. Namely, the charging power P2 may be set as the upper-limit charging power for the charging current that is limited so as not to induce overvoltage, and the battery 1 may be charged with the amount of power equal to or smaller than the upper-limit charging power, in the second charge mode.

Figure 6:
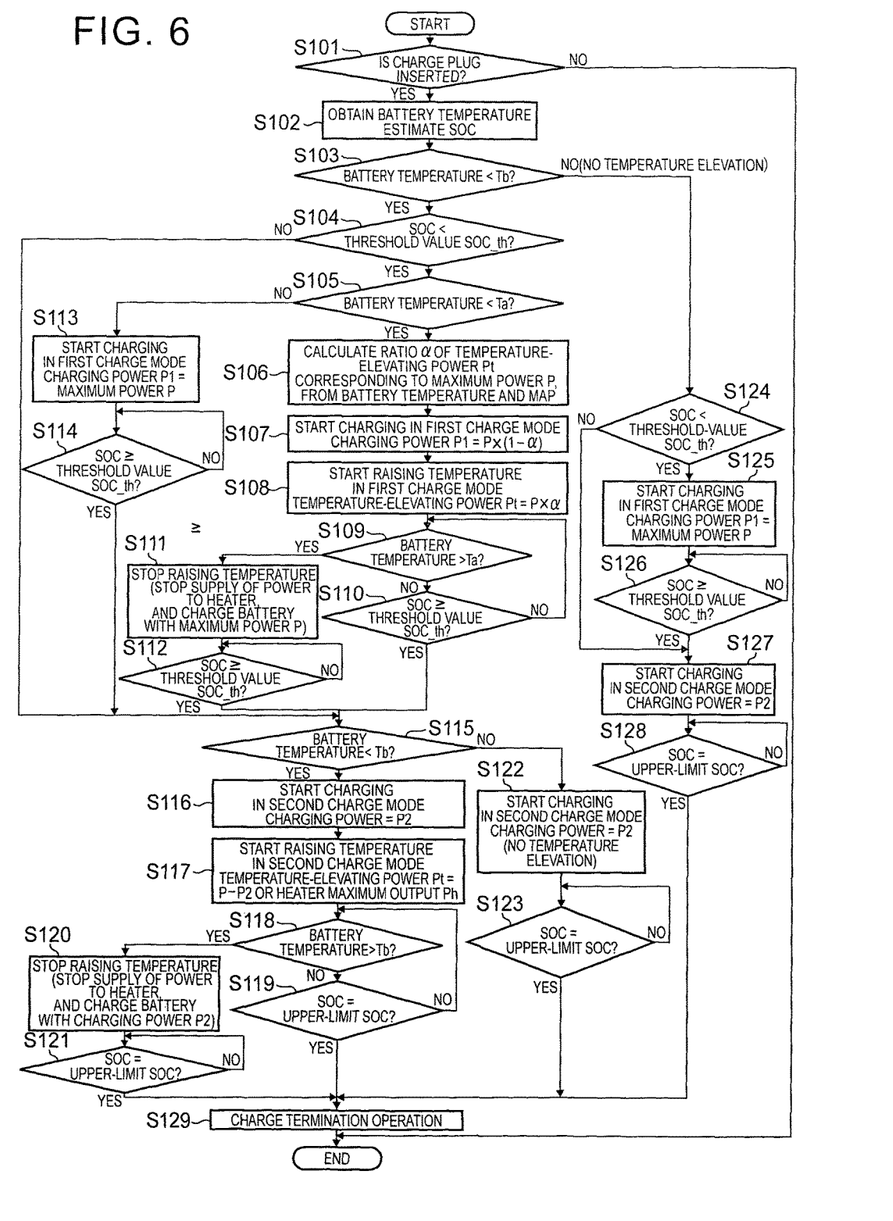
FIG. 6 is a view showing processing flow of the external charge control including the temperature regulation control of the battery according to the first embodiment.

FIG. 6 is a view illustrating processing flow of external charge control including the temperature regulation control of this embodiment. The processing of FIG. 6 is carried out by the charge control device 30.

When the charge plug 22 is connected to the inlet 21 (YES in step S101), a charge plug connection signal is generated from the inlet 21 to the charge control device 30, so that the charge control device 30 starts external charge control.

At the start of the external charge control, the charge control device 30 switches the charge relays Rch1, Rch2 from OFF to ON, and connects the charger 20 with the battery 1. At this time, the charge control device 30 obtains the battery temperature T of the battery 1 measured when charging is started, from the temperature sensor 8. Also, the charge control device 30 obtains a detected voltage value of the battery 1 from the monitoring unit 6, and calculates the initial SOC at the start of charging (step S102).

When the detected battery temperature T is higher than a temperature Tb (NO in step S103), the charge control device 30 performs normal external charging, without raising the temperature of the battery 1 using the battery heater 40 (step S124). The temperature Tb is set in advance as a temperature at which the battery 1 need not be heated by the battery heater 40, and may be obtained by experiment, or the like, in view of the charging efficiency that varies with the battery temperature.

When the battery temperature T is lower than the temperature Tb (YES in step S103), the charge control device 30 determines whether the initial SOC is smaller than the threshold value SOC_th (step S104). When the initial SOC is smaller than the threshold value SOC_th, the charge control device 30 determines whether the battery temperature T is lower than a temperature Ta (step S105). The temperature Ta is a temperature threshold value provided for determining whether temperature regulation is performed in the first charge mode, in other words, whether the temperature of the battery 1 needs to be raised. The temperature Ta may be set to a smaller value than the temperature Tb.

When it is determined in step S104 that the initial SOC is larger than the threshold value SOC_th, the charge control device 30 proceeds to step S115, and starts charge control in the second charge mode, without performing charge control in the first charge mode.

When the initial SOC is smaller than the threshold value SOC_th, and the battery temperature T is lower than the temperature Ta, the charge control device 30 supplies a part of external power to the battery heater 40, so as to raise the temperature of the battery 1 during charging, while charging the battery 1 in the first charge mode.

Initially, the charge control device 30 calculates (specifies) the ratio α of the temperature-elevating power Pt to the maximum power P, from the battery temperature T detected in step S102, using the map shown in FIG. 4 (step S106). The charge control device 30 calculate the charging power P1 of the first charge mode, from the maximum power P and the calculated ratio α. Namely, the charge control device 30 sets a difference between the maximum power P and the temperature-elevating power Pt calculated from the ratio α, as the charging power P1, and starts charging the battery 1 (step S107). Also, the charge control device 30 calculates the temperature-elevating power Pt corresponding to the maximum power P, from the ratio α calculated in step S106, and sets the calculated temperature-elevating power Pt as the temperature-elevating power of the first charge mode. The charge control device 30 starts temperature elevation control for delivering the thus set temperature-elevating power to the battery heater 40 (step S108). The temperature-elevating power Pt is supplied to the battery heater 40, via the DC/DC converter 20a of the charger 20. Steps S107 and S108 may be sequentially executed at the same timing, or in a short time that can be considered as being equivalent to the same timing.

The charge control device 30 detects the battery temperature T and SOC (voltage) of the battery 1 as needed, while the temperature-elevating power Pt, as part of the external power, is supplied to the battery heater 40, and the charging power P1, as the remaining part of the external power, is supplied to the battery 1 for charging. When the battery temperature T becomes higher than the temperature Ta (step S109), during charging in the first charge mode involving temperature elevation, the supply of the temperature-elevating power Pt to the battery heater 40 is stopped, to stop raising the battery temperature, and the charging power P1 is set to the maximum power P, so that the battery 1 is charged with the maximum power P (step S111).

On the other hand, in the first charge mode, charging is conducted with charging current corresponding to the charging power P1 (step S110), until the SOC of the battery 1 becomes equal to the threshold value SOC_th. When the SOC of the battery 1 becomes larger than the threshold value SOC_th (YES in step S110), the charge control device 30 finishes charging in the first charge mode, and switches to the second charge mode, even when the battery temperature T is lower than the temperature Ta. Similarly, in step S112, when the SOC becomes larger than the threshold value SOC_th after the temperature elevation is stopped (YES in step S112), the charge control device 30 finishes charging in the first charge mode, and switches to the second charge mode.

When it is determined in step S105 that the battery temperature T is higher than the temperature Ta, the temperature of the battery 1 need not be raised during charging in the first charge mode. Therefore, the charge control device 30 sets the charging power P1 to the maximum power P, and performs control for charging the battery 1 with the maximum power P (step S113). When the SOC of the battery 1 becomes larger than the threshold value SOC_th (YES in step S114), the charge control device 30 finishes charging in the first charge mode, and switches to the second charge mode.

Next, the charge control device 30 determines in step S115 whether the battery temperature T is lower than the temperature Tb. When the battery temperature T is higher than the temperature Tb, it is determined that there is no need to raise the temperature of the battery 1 using the battery heater 40 during charging in the second charge mode, and starts charging in the second charge mode without raising the temperature of the battery 1 (step S122).

When it is determined that the battery temperature T is lower than the temperature Tb when charging is started in the second charge mode (YES in step S115), the charge control device 30 determines that there is a need to raise the temperature of the battery 1 with the battery heater 40 during charging in the second charge mode, and controls, the system so as to deliver the charging power P2 to the battery 1 (step S116), and also supply the temperature-elevating power that is larger than the temperature-elevating power Pt in the first charge mode, to the battery heater 40 (step S117).

In step S116, charging is started with the charging power P2 as a fixed value set in advance as described above. Also, the difference power (P−P2) obtained by subtracting the charging power P2 from the maximum power P, or the maximum output Ph of the battery heater 40, is set as the temperature-elevating power Pt of the second charge mode, and the temperature-elevating power Pt is supplied to the battery heater 40.

The charge control device 30 detects the battery temperature T and SOC of the battery 1, during charging in the second charge mode involving temperature elevation. When the battery temperature T is higher than the temperature Tb (step S118), the charge control device 30 stops supply of the temperature-elevating power Pt to the battery heater 40, to stop raising the temperature of the battery 1 in the second charge mode, and controls the system so as to charge the battery 1 with the charging power P2 (step S120).

When the SOC of the battery 1 becomes equal to the upper-limit SOC (step S119) during charging in the second charge mode involving temperature elevation, the charge control device 30 performs a charge termination operation to finish external charge control (step S129) even when the battery temperature T is lower than the temperature Tb. Also, when the SOC of the battery 1 becomes equal to the upper-limit SOC (S121) after the temperature elevation is stopped and the battery 1 is controlled to be charged with the charging power P2, the charge control device 30 performs a charge termination operation to finish external charge control (step S129).

When it is determined in step S115 that the battery temperature T is higher than the temperature Tb, the charge control device 30 performs only charge control for charging the battery 1 with the charging power P2 (step S122), since there is no need to raise the temperature of the battery 1 during charging in the second charge mode. Then, when the SOC of the battery 1 becomes equal to the upper-limit SOC (YES in step S123), the charge control device 30 performs a charge termination operation to finish external charge control (step S129).

When it is determined in step S103 that the battery temperature T is higher than the temperature Tb, it is determined that there is no need to raise the temperature of the battery 1 in both the first charge mode and the second charge mode, in other words, over the entire external charge control. In this case, normal external charging without temperature elevation is performed. When the initial SOC is smaller than the threshold value SOC_th (YES in step S124), the charge control device 30 sets the charging power P1 to the maximum power P, and performs control for charging the battery 1 with the maximum power P (step S125). When the SOC of the battery 1 becomes larger than the threshold value SOC_th (YES in step S126), the charge control device 30 finishes charging in the first charge mode, and switches to the second charge mode.

Then, the charge control device 30 starts charging in the second charge mode, and performs only charge control for charging the battery 1 with the charging power P2 as the fixed value (step S127). When the SOC of the battery 1 becomes equal to the upper-limit SOC (YES in step S128), the charge control device 30 performs a charge termination operation to finish external charge control (step S129). When it is determined in step S124 that the initial SOC is larger than the threshold value SOC_th, the charge control device 30 controls the system so as to start external charging in the second charge mode (step S127).

In the charge termination operation of step S129, the SOC (terminal SOC) of the battery 1 at the time of termination of charging is calculated, so that the full charge capacity is calculated, and the charge relays Rch1, Rch2 are switched from ON to OFF, so as to disconnect the charger 20 from the battery 1. The full charge capacity may be calculated, using the initial SOC and terminal SOC, and the integrated value of charging current supplied to the battery 1 in the first charge mode and/or the second charge mode.

In the above description, the external charge control involving the temperature regulation control of this embodiment has been described, with respect to instant charging, as one example, which is started when triggered by connection of the charge plug 22 extended from the external power supply 23, to the inlet 21. However, the invention is not limited to this type of charging.

The invention may be applied to timer charging in which charging is started at a preset charge start time. For example, when a timer charge switch (not shown) is pushed, the user is allowed to set a charge start time and/or a charge end time, and charging is started when the set charge start time comes, or charging is started when a charge start time calculated from the set charge end time and the current time comes. In the example of FIG. 6, it may be determined before step S101 whether the current time is the charge start time, and external charging may be started when the current time is the charge start time. The system may also be forced to finish external charging when the charge end time comes during external charge control.

According to this embodiment, the ratio $\alpha$ at which the charging time is minimized is specified for each battery temperature of the battery 1 measured when charging is started, and temperature regulation control during charging is performed with the optimum temperature-elevating power Pt relative to the maximum power P. It is thus possible to charge the battery 1 in a short time while raising the temperature of the battery 1.

The ratio $\alpha$ between the maximum power P and the temperature-elevating power Pt as shown in FIG. 3 and FIG. 4 varies depending on the maximum power P. This is because the amount of electric power that can be used as the temperature-elevating power Pt, in other words, the amount of power that can be used as the charging power, varies depending on the maximum power P. Accordingly, the map shown in FIG. 4 may be stored in the memory 30a, for each charging specification (the maximum power, the maximum output voltage, the maximum output current) of the external power supply 23.

In this case, the charge control device 30 performs an operation to check the maximum power P in step S1111 shown in a modified example of FIG. 8 which will be described later. Then, in step S106 of FIG. 6, the charge control device 30 retrieves a map corresponding to the maximum power P from the memory 30a, and calculates the ratio $\alpha$ from the battery temperature obtained in step S102.

Figure 7:
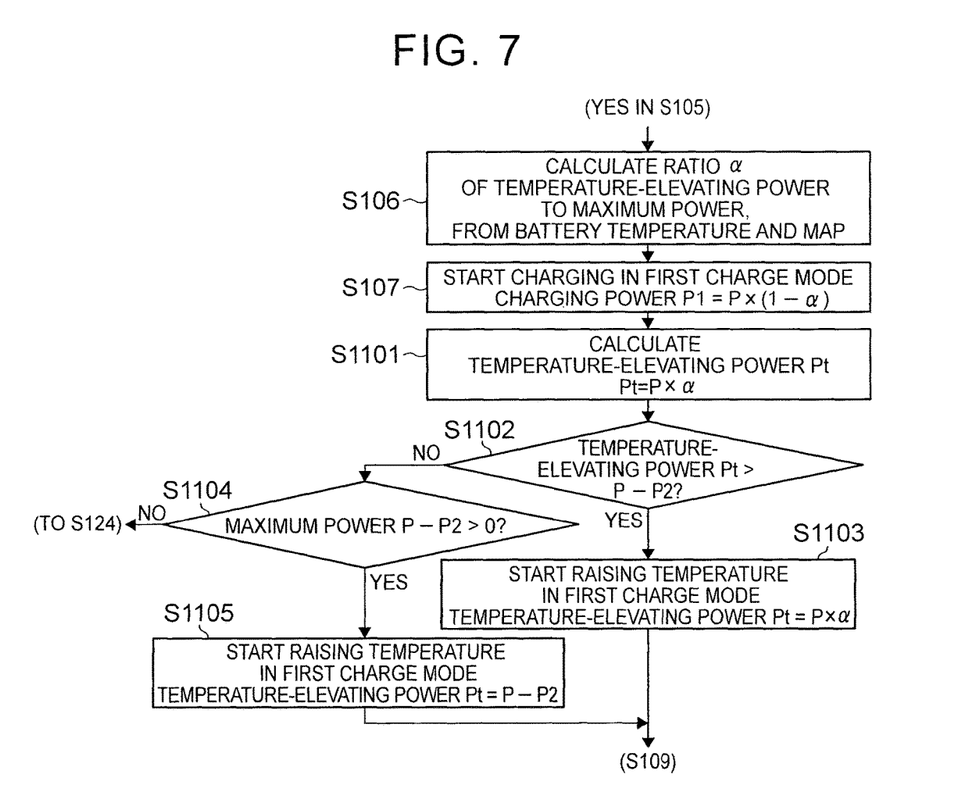
FIG. 7 is a view showing a modified example of a method of calculating the temperature-elevating power in the first charge mode, in the processing flow of the external charge control of the first embodiment.

FIG. 7 shows a modified example of a method of calculating the temperature-elevating power Pt during charging in the first charge mode, in the external charge control of this embodiment.

The external charging of this embodiment is performed in the first charge mode and the second charge mode. When the charging power P1 of the first charge mode is reduced, the charging time in the first charge mode is prolonged, and the total charging time is prolonged. In this embodiment, in particular, charging is conducted with the charging power P1 of the first charge mode being set to be larger than the charging power P2 of the second charge mode. Therefore, when the charging power P1 is reduced due to the use of a part of the external power as the temperature-elevating power Pt, the charging time is prolonged. Thus, in order to suppress prolongation of the charging time, the charging power P2 of the second charge mode may be set as the charging power to be secured at the least in the first charge mode.

In the meantime, the maximum power P of the external power supply 23 varies depending on the output specifications of the external power supply 23. In the case of a commercial power supply, for example, standard output voltages in Japan are 100V and 200V, and standard output voltages in foreign countries include those equal to or higher than 200V. Accordingly, depending on the maximum power P of the external power, electric power obtained by subtracting the temperature-elevating power Pt based on the map shown in FIG. 4 from the maximum power P may be smaller than the charging power P2 of the second charge mode, and the charging power P2 to be secured at the least in the first charge mode may not be secured.

Thus, when the temperature-elevating power calculated from the ratio α based on the map is set as the temperature-elevating power Pt of the first charge mode, a difference between the temperature-elevating power calculated based on the ratio α and the maximum power P is set as the charging power P1. When the set charging power P1 is smaller than the charging power P2 as the fixed value, the temperature-elevating power Pt of the first charge mode is newly changed and set so that the charging power P1 becomes larger than the charging power P2.

Namely, when the charging power P1 (=charging power P2) to be secured at the least in the first charge mode, out of the maximum power P of the external power, cannot be secured, the temperature-elevating power Pt during charging in the first charge mode is set (changed) with a higher priority given to charging than to temperature elevation.

More specifically, a difference power obtained by subtracting the charging power P2 from the maximum power P of the external power is compared with the temperature-elevating power Pt calculated from the ratio α based on the map shown in FIG. 4, and the temperature regulation using the battery heater 40 is performed in the first charge mode, using the smaller one of the difference power and the calculated temperature-elevating power Pt. With this arrangement, prolongation of the charging time in the first charge mode can be suppressed.

The temperature-elevating power corresponding to the ratio α based on the map shown in FIG. 4 is the temperature-elevating power relative to the maximum power P of the external power when the charging time is shortest. Therefore, when the temperature regulation control is performed with the difference power (P−P2) that is smaller than the temperature-elevating power corresponding to the ratio α, the charging time in the first charge mode becomes longer than the shortest charging time. However, when the charging power is small, the charging time is not shortened even when the temperature of the battery 1 is elevated. Therefore, through the temperature regulation control during charging in the first charge mode in which a higher priority is given to charging than to temperature elevation, the charging time becomes longer than the shortest charging time based on temperature elevation using the temperature-elevating power corresponding to the ratio α according to the map; however, since the prolongation of the charging time in the first charge mode is suppressed so that a transition from the first charge mode to the second charge mode is made earlier, the charging time can be shortened, as compared with the case where the required minimum charging power P2 cannot be secured.

As shown in FIG. 7, after execution of step S107 shown in FIG. 6, the charge control device 30 calculates the temperature-elevating power Pt used in the first charge mode, from the ratio α calculated in step S106 and the maximum power P of the external power (S1101).

When the charge control device 30 sets the temperature-elevating power Pt calculated according to the ratio α, as the temperature-elevating power used in the first charge mode, it is determined whether the temperature-elevating power Pt calculated according to the ratio α is larger than the difference power (P−P2) (S1102). When the temperature-elevating power Pt is larger than the difference power, the charging power P1 used in the first charge mode is set to a difference between the maximum power P and the temperature-elevating power Pt calculated according to the ratio α, and the temperature-elevating power Pt calculated according to the ratio α is set as the temperature-elevating power. Then, the set temperature-elevating power starts being supplied to the battery heater 40, so as to start raising the temperature of the battery 1 (S1103).

When the temperature-elevating power Pt is smaller than the difference power, and the difference power (P−P2) is larger than 0 (YES in step S1104), in other words, when a difference between the maximum power P and the temperature-elevating power Pt calculated according to the ratio α is set as the charging power P1, and the set charging power P1 is smaller than the charging power P2 as the fixed value, the temperature-elevating power Pt used in the first charge mode is set to the difference power (P−P2) so that the charging power P1 becomes larger than the charging power P2. The charge control device 30 starts supplying the difference power (P−P2) that is different from the temperature-elevating power Pt calculated according to the ratio α, to the battery heater 40, so as to start raising the temperature of the battery 1 (S1105). When it is determined in step S1104 that the difference power (P−P2) is smaller than 0, the charge control device 30 determines that there is no electric power that can be used as temperature-elevating power Pt, out of the maximum power P of the external power, and proceeds to step S124 to control the system to perform normal external charging without temperature elevation.

Figure 8:
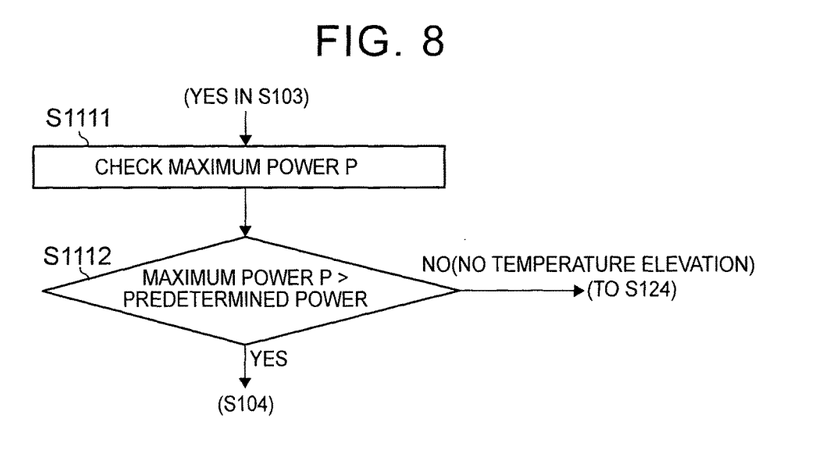
FIG. 8 is a view showing a modified example in which processing flow for inhibiting temperature regulation control depending on the maximum power of the external power is added to the processing flow of the external charge control of the first embodiment.

FIG. 8 shows a modified example in which processing flow for inhibiting temperature regulation control according to the maximum power P of the external power is added to the external charge control of this embodiment.

As explained above with respect to the modified example of FIG. 7, where the maximum power P of the external power is low, the charging power is reduced with reduction of the maximum power P, and the charging time is not shortened even when the temperature of the battery 1 is raised. Thus, in the modified example shown in FIG. 8, it is determined in advance whether the maximum power P can surely provide the required charging power P2 during charging in the first charge mode, and external charge control involving the temperature regulation of the battery 1 is performed when the required charging power P2 can be secured.

As shown in FIG. 8, when it is determined in step S103 that the battery temperature T of the battery 1 is lower than the temperature Tb, and the temperature of the battery 1 needs to be raised, the charge control device 30 obtains charge specification information on the maximum power (or the maximum output voltage, the maximum output current) from the external power supply 23 via the inlet 21 and the charge plug 22, when the external charge control is started (step S1111). When the obtained maximum power P is smaller than a predetermined power (NO in step S1112), the charge control device 30 proceeds to step S124, and controls the system so as to perform normal external charging without temperature elevation. When the maximum power P is larger than the predetermined power (YES in step S1112), the charge control device 30 proceeds to step S104 to perform charging in the first charge mode and/or charging in the second charge mode, while raising the temperature of the battery 1.

As the predetermined power used in step S1112, the charging power P2 set in advance in the second charge mode, or any power that is larger than the charging power P2 may be set. For example, since charging is conducted in the first charge mode with the charging power P1 that is larger than the charging power P2 of the second charge mode, electric power that is larger than the charging power P2 may be set as a threshold value for the maximum power P based on which it is determined whether the temperature of the battery 1 is to be raised, so that a transition from the first charge mode to the second charge mode can be made early, as described above.

While charging is conducted in two stages of the first charge mode and the second charge mode in the embodiment as described above, the invention is not limited to this arrangement. For example, the system may be controlled in three or more different charge modes, or only in one charge mode, during the charging period (i.e., until the SOC is increased to the upper-limit SOC). It is also possible to charge the battery with a constant charging current, without setting any mode. In this case, too, the ratio α at which the charge time is minimized is specified in advance for each battery temperature of the battery 1 measured when charging is started, so that temperature regulation control during charging can be performed with the optimum temperature-elevating power Pt relative to the maximum power P, and charging can be completed in a short time while raising the temperature of the battery.

The invention claimed is:

1. A power storage system for a vehicle, the power storage system comprising:
    a battery configured to supply electric power to a motor for traveling of the vehicle, the battery being configured to be charged with external power supplied from an external power supply;
    a temperature sensor configured to detect a temperature of the battery;
    a battery heater configured to raise the temperature of the battery;
    a charger configured to be connectable with the external power supply, and deliver the external power to the battery and the battery heater, respectively; and
    a controller configured to
        perform charge control, the charge control being a control that charges the battery with the external power;
        store a map, the map specifying a ratio of a temperature-elevating power supplied to the battery heater to a maximum power of the external power at which a charging time is minimum, for each temperature of the battery at the time when charging is started;
        calculate the ratio, using the map, from the temperature of the battery measured when charging is started,
        perform temperature regulation control during charging, using constant temperature-elevating power corresponding to the calculated ratio, the temperature regulation control being a control that supplies the constant temperature-elevating power to the battery heater during charging so as to raise the temperature of the battery,
    perform the charge control and the temperature regulation control in a first charge mode and a second charge mode, the first charge mode being a mode in which the battery is charged with a first charging power until an amount of charge of the battery becomes equal to a first charge amount, and a first temperature-elevating power is supplied to the battery heater, the second charge mode being a mode in which the battery is charged with a second charging power as a fixed value after the amount of charge of the battery reaches the first charge amount, and a second temperature-elevating power is supplied to the battery heater,
    wherein the second charging power is greater than zero,
    wherein the second charging power is smaller than the first charging power.

2. The power storage system according to claim 1, wherein the controller is configured to
    set a difference between the temperature-elevating power calculated based on the map and the maximum power as the first charging power and the temperature-elevating power calculated based on the map as the first temperature-elevating power, and
    newly set the first temperature-elevating power such that the first charging power becomes larger than the second charging power when the set first charging power is smaller than the second charging power.

3. The power storage system according to claim 2, wherein the controller is configured to
    compare a difference between the maximum power and the second charging power with the temperature-elevating power calculated based on the map,
    set the first temperature-elevating power using a smaller one of the difference and the temperature-elevating power calculated based on the map, and
    set a difference between the maximum power and the set first temperature-elevating power as the first charging power.

4. The power storage system according to claim 1, wherein
    the first charge mode is a mode in which a difference between the maximum power of the external power and the temperature-elevating power calculated based on the map is set as the first charging power, while the temperature-elevating power calculated based on the map is supplied to the battery heater, and the second charge mode is a mode in which the battery is charged with the second charging power that is smaller than the first charging power after the amount of charge of the battery reaches the first charge amount, and a difference between the maximum power and the second charging power, or electric power corresponding to a maximum output of the battery heater, is supplied to the battery heater.

5. The power storage system according to claim 1, further comprising a monitoring unit that detects a voltage between terminals of the battery and outputs a voltage value to the controller, and a current sensor that detects electric current that flows through the battery and outputs a current value to the controller,
    wherein the controller estimates a state of charge (SOC) of the battery based on the voltage value detected by the monitoring unit, the current value detected by the current sensor, and the battery temperature detected by the temperature sensor, and performs the charge control of the battery, based on the estimated SOC and a predetermined upper limit of the SOC.

6. The power storage system according to claim 2, wherein in the first charge mode constant-current (CC) charging is performed, and in the second charge mode constant-current constant-voltage (CCCV) charging is performed.

7. The power storage system according to claim 1, wherein a non-contact charging system supplies the external power from the external power supply to the battery.

* * * * *